(12) United States Patent
Lin et al.

(10) Patent No.: US 12,444,935 B2
(45) Date of Patent: Oct. 14, 2025

(54) ELECTROSTATIC DISCHARGE PROTECTION CIRCUIT

(71) Applicant: Vanguard International Semiconductor Corporation, Hsinchu (TW)

(72) Inventors: Chih-Hsuan Lin, Hsinchu (TW); Shao-Chang Huang, Hsinchu (TW); Yeh-Ning Jou, Hsinchu (TW); Chieh-Yao Chuang, Kaohsiung (TW); Hwa-Chyi Chiou, Hsinchu (TW); Wen-Hsin Lin, Hsinchu County (TW); Kai-Chieh Hsu, Taoyuan (TW); Ting-Yu Chang, Hsinchu County (TW); Hsien-Feng Liao, Taichung (TW)

(73) Assignee: VANGUARD INTERNATIONAL SEMICONDUCTOR CORPORATION, Hsinchu (TW)

( * ) Notice: Subject to any disclaimer, the term of this patent is extended or adjusted under 35 U.S.C. 154(b) by 135 days.

(21) Appl. No.: 18/499,501

(22) Filed: Nov. 1, 2023

(65) Prior Publication Data
US 2025/0141220 A1    May 1, 2025

(51) Int. Cl.
*H02H 9/04*    (2006.01)
(52) U.S. Cl.
CPC .................................. *H02H 9/046* (2013.01)
(58) Field of Classification Search
CPC ..................................................... H02H 9/046
(Continued)

(56) References Cited

U.S. PATENT DOCUMENTS 5,825,601 A * 10/1998 Statz .................... H10D 89/811
                                                      361/111
6,069,782 A *  5/2000 Lien ....................... H10D 89/60
                                                      361/111
(Continued)

FOREIGN PATENT DOCUMENTS

TW    200931627 A    7/2009
TW    201011888 A1   3/2010
(Continued)

OTHER PUBLICATIONS

Taiwanese Office Action and Search Report for Taiwanese Application No. 112130886, dated Apr. 19, 2024.

*Primary Examiner* — Dharti H Patel
(74) *Attorney, Agent, or Firm* — Birch, Stewart, Kolasch & Birch, LLP

(57) ABSTRACT

An ESD protection circuit is coupled to a first pad and includes an ESD detection circuit, a P-type transistor, an N-type transistor, and a discharge circuit. The ESD detection circuit determines whether an ESD event occurs on the first pad to generate a detection signal at a first node. The P-type transistor comprises a source coupled to the first pad, a drain coupled to a second node, and a gate coupled to the first node. The N-type transistor comprises a drain coupled to the second node, a source coupled to a ground, and a gate coupled to a second pad. The discharge circuit is coupled between the first pad and the ground and controlled by a driving signal at the second node. When the ESD protection circuit is in an operation mode, the first pad receives a first voltage, and a second pad receives a second voltage.

12 Claims, 6 Drawing Sheets

(58) Field of Classification Search
USPC .......................................................... 361/56
See application file for complete search history.

(56) References Cited

U.S. PATENT DOCUMENTS

| | | | | |
|---|---|---|---|---|
| 8,068,319 | B1* | 11/2011 | Chan | H10D 89/921 |
| | | | | 361/111 |
| 9,025,289 | B1* | 5/2015 | Peng | H02H 9/046 |
| | | | | 361/118 |
| 10,312,230 | B2* | 6/2019 | Torres | H02H 9/041 |
| 10,867,989 | B2* | 12/2020 | Lin | H10D 89/811 |
| 11,955,796 | B2* | 4/2024 | Li | H10D 89/611 |
| 2007/0053120 | A1* | 3/2007 | Gauthier | H02H 9/046 |
| | | | | 361/56 |
| 2010/0148797 | A1* | 6/2010 | Ker | H02H 9/046 |
| | | | | 324/555 |
| 2015/0084702 | A1* | 3/2015 | Tesch | H02H 9/046 |
| | | | | 330/298 |
| 2015/0295399 | A1* | 10/2015 | Wang | H02H 9/045 |
| | | | | 361/56 |
| 2018/0159323 | A1 | 6/2018 | Huang et al. | |
| 2021/0305809 | A1 | 9/2021 | Hung et al. | |
| 2022/0285932 | A1* | 9/2022 | Lin | H02H 9/046 |
| 2023/0105593 | A1 | 4/2023 | Fan et al. | |
| 2024/0222965 | A1* | 7/2024 | Huang | H02H 9/046 |
| 2025/0141220 | A1* | 5/2025 | Lin | H02H 9/046 |

FOREIGN PATENT DOCUMENTS

| | | |
|---|---|---|
| TW | 202308254 A | 2/2023 |
| TW | 202316615 A | 4/2023 |

* cited by examiner

ELECTROSTATIC DISCHARGE PROTECTION CIRCUIT

BACKGROUND OF THE INVENTION

Field of the Invention

The present invention relates to an electrostatic discharge protection circuit, in particular to a high-voltage-withstanding electrostatic discharge protection circuit.

Description of the Related Art

As the process of manufacturing integrated circuits has developed, the size of semiconductor components has been reduced to the sub-micron level to improve the performance and operation speed of the integrated circuits. However, the reduction of the size of the components has caused some reliability problems. This is particularly true for integrated circuits, in which the protection against electrostatic discharge (ESD) is seriously affected. When the component size is reduced due to advanced process technology, the capability of electrostatic discharge protection is also greatly reduced, which results in a significant decrease in the ESD tolerance of the component. Therefore, an ESD protection circuit is needed to protect components from being damaged by an ESD event.

BRIEF SUMMARY OF THE INVENTION

The invention provides an exemplary embodiment of an electrostatic discharge protection circuit coupled to a first bonding pad. The electrostatic discharge protection circuit comprises an electrostatic discharge detection circuit, a P-type transistor, a first N-type transistor, and a discharge circuit. The electrostatic discharge detection circuit detects whether an electrostatic discharge event occurs on the first bonding pad to generate a detection signal on a first node. The P-type transistor comprises a source coupled to the first bonding pad, a drain coupled to a second node, and a gate coupled to the first node for receiving the detection signal. The first N-type transistor comprises a drain coupled to the second node, a source coupled to a ground, and a gate coupled to a second bonding pad. The discharge circuit is coupled between the first bonding pad and the ground, and further is controlled by a driving signal on the second node. When the electrostatic discharge protection circuit is in an operation mode, the first bonding pad receives a first voltage, and the second bonding pad receives a second voltage.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
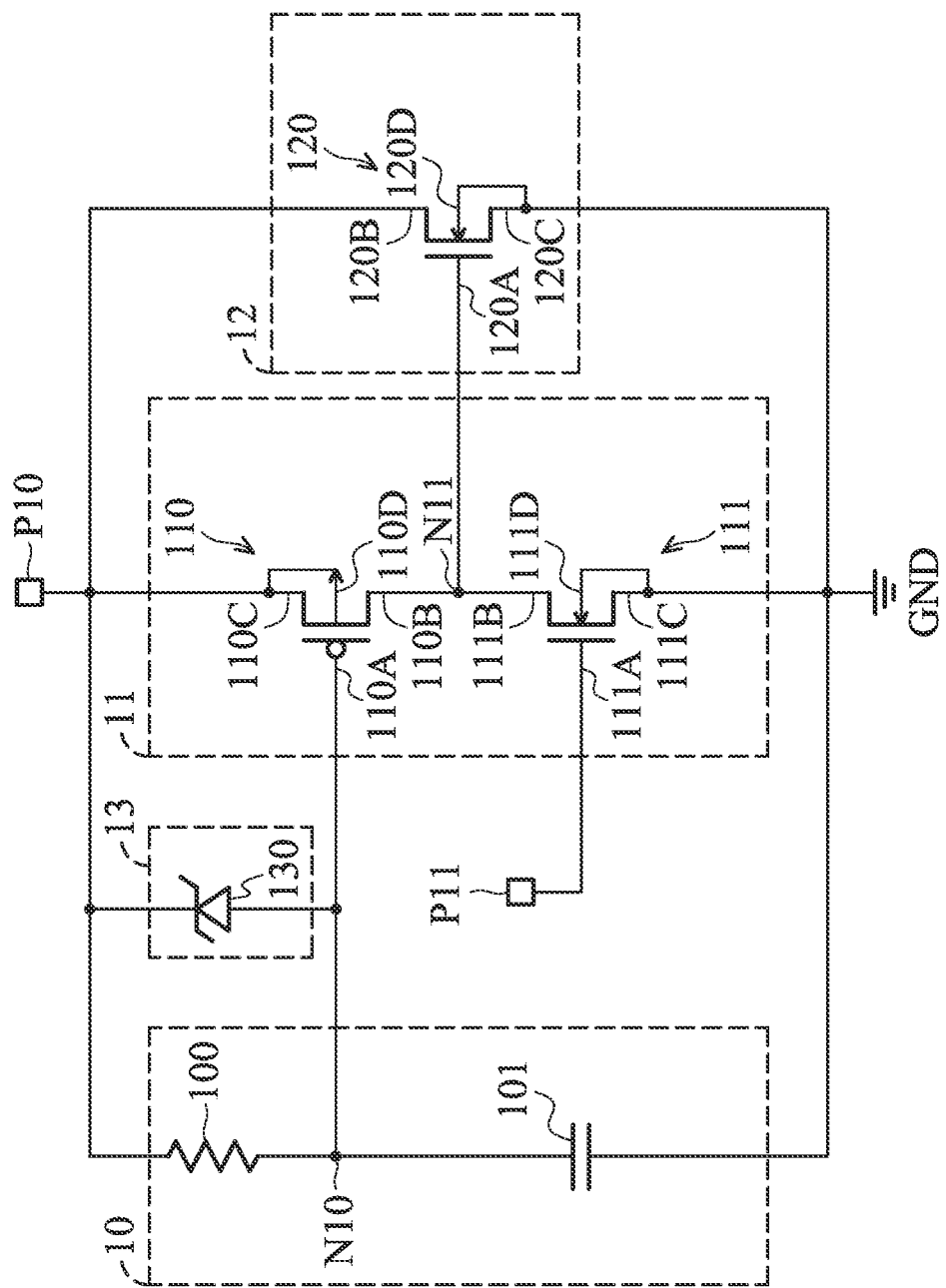
FIG. 1 shows one exemplary embodiment of an electrostatic discharge protection circuit.

FIG. 1 shows one exemplary embodiment of an electrostatic discharge (ESD) protection circuit. Referring to FIG. 1, an electrostatic discharge protection circuit 1 comprises an electrostatic discharge detection circuit 10, a driving circuit 11, a discharge circuit 12, and a voltage clamping circuit 13. The electrostatic discharge protection circuit 1 is coupled to bonding pads P10 and P11. When the electrostatic discharge protection circuit 1 is in an operation mode, the bonding pads P10 and P11 receive respective voltages. In the case where the ESD protection circuit 1 is not in the operation mode, when an electrostatic discharge event occurs on the bonding pad P10, the electrostatic discharge protection circuit 1 provides a discharge path between the bonding pad P10 and a ground GND to protect the components or devices connected to the bonding pad P10 from being damaged by the large current induced by the electrostatic discharge event.

Referring to FIG. 1, the electrostatic discharge detection circuit 10 is coupled between the bonding pad P10 and the ground GND. The electrostatic discharge detection circuit 10 comprises a resistor 100 and a capacitor 101. The resistor 100 is coupled between the bonding pad P10 and a common node N10, and the capacitor 101 is coupled between the common node N10 and the ground GND. According to the connection between the resistor 100 and the capacitor 101, the resistor 100 and the capacitor 101 form a resistor-capacitor (RC) circuit structure. The electrostatic discharge detection circuit 10 detects whether an electrostatic discharge event occurs on the bonding pad P10 to generate a detection signal on the common node N10.

The driving circuit 11 is coupled between the bonding pad P10 and the ground GND. The driving circuit 11 comprises a P-type metal-oxide-semiconductor (PMOS) transistor 110 and an N-type metal-oxide-semiconductor (NMOS) transistor 111. In addition, the discharge circuit 12 is coupled between the bonding pad P10 and the ground GND. The discharge circuit 12 comprises an NMOS transistor 120. In the embodiment, each of the MOS transistors 110, 111, and 120 comprises a gate, a drain, a source, and a bulk. In one embodiment, the MOS transistors 110, 111, and 120 are implemented by transistors with a gate-source withstanding voltage greater than 5 volts (V).

As shown in FIG. 1, the source 110C and the bulk 110D of the PMOS transistor 110 are coupled to the bonding pad P10, the drain 110B thereof is coupled to a common node N11, and the gate 110A thereof is coupled to the common node N10. The drain 111B of the NMOS transistor 111 is coupled to the common node N11, the source 111C and the bulk 111D thereof are coupled to the ground GND, and the gate 111A thereof is coupled to the bonding pad P11. Based on the connection structure of the transistors 110 and 111, the driving circuit 11 generates a driving signal on the common node N11 according to the detection signal on the common node N10 and the voltage on the bonding pad P11. The drain 120B of the NMOS transistor 120 is coupled to the bonding pad P10, the source 120C and the bulk 120D thereof are coupled to the ground GND, and the gate 120A thereof is coupled to the common node N11. According to the circuit structure of the discharge circuit 12, when an electrostatic discharge event occurs on the bonding pad P10, the NMOS transistor 120 of the discharge circuit 12 is turned on by a gate-triggered manner to provide a discharge path.

Referring to FIG. 1, the voltage clamping circuit 13 is coupled between the source 110C and the gate 110A of the PMOS transistor 110, that is, between the bonding pad P10 and the common node N10. When the electrostatic discharge protection circuit 1 is in the operation mode, the voltage clamping circuit 13 is provided to clamp the gate-source voltage (Vgs) between the gate 110A and the source 110C of the PMOS transistor 110 within a voltage range. In the embodiment, the voltage clamping circuit 13 comprises a Zener diode 130. The cathode of the Zener diode 130 is coupled to the source 110C of the PMOS transistor 110 (that is, the cathode thereof is coupled to the bonding pad P10), and the anode thereof is coupled to the gate 110A of the PMOS transistor 110 (that is, the anode thereof is coupled to the common node N10). In the operation mode, based on the constant voltage characteristic of the Zener diode 130, the gate-source voltage (Vgs) of the PMOS transistor 110 can be clamped at the gate-source withstanding voltage that is determined based on the parameters of the PMOS transistor 110 or below the aforementioned gate-source withstanding voltage, thereby preventing the PMOS transistor 110 from being damaged by the excessive gate-source voltage (Vgs) of the PMOS transistor 110 that is induced by a high voltage on the bonding pad P10.

The operation of the electrostatic discharge protection circuit 1 will be described in the following paragraphs with reference to FIGS. 2A-2B.

Figure 2A:
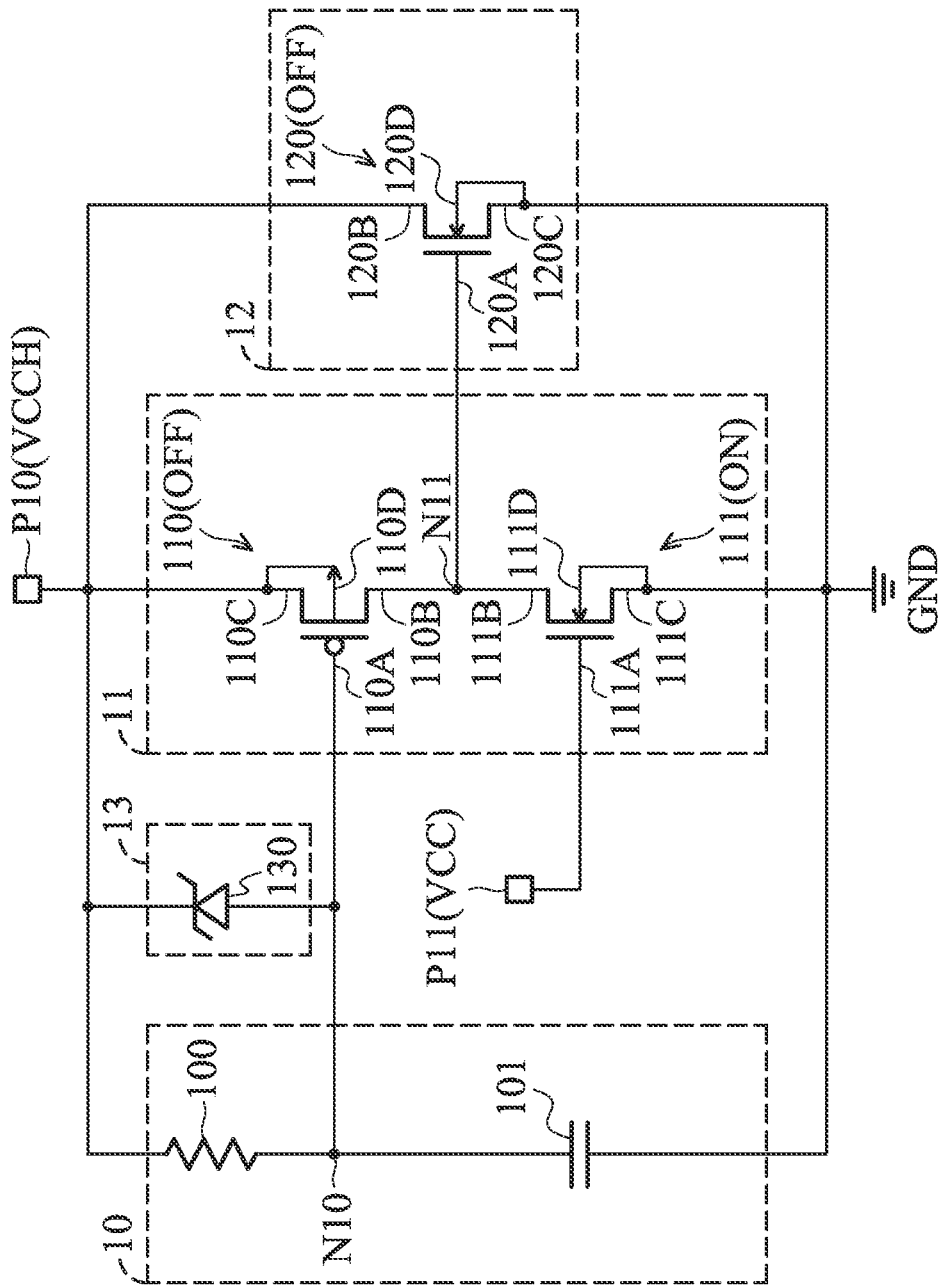
FIG. 2A is a schematic diagram showing an exemplary embodiment of an operation of the ESD protection circuit in FIG. 1 in a normal operation mode.

Referring to FIG. 2A, when the ESD protection circuit 1 is in the operation mode, a voltage VCCH is provided to the bonding pad P10, a voltage VCC is provided to the bonding pad P11, and the ground GND has a ground voltage (that is, 0 V). For example, in the case where the MOS transistors 110, 111, and 120 are implemented by transistors with a gate-source withstanding voltage of 5 V, the voltage VCCH is greater than or equal to 5 V, and the voltage VCC is less than or equal to 5 V (for example 5 V, 3.3 V, or 1.8 V). In the operation mode, the voltage VCCH charges the capacitor 101 through the resistor 100 so that the detection signal on the common node N10 has a high voltage level, that is, there is a high voltage, which is close to the voltage VCCH (being greater than or equal to 5 V), on the common node N10. The high voltage on the common node N10 (that is, the detection signal with the high voltage level) turns off (OFF) the PMOS transistor 110. In addition, the NMOS transistor 101 is turned on (ON) according to the voltage VCC on the bonding pad P11. Therefore, based on the ground voltage of the ground GND, the driving signal on the common node N11 has a low voltage level, that is, there is a low voltage (the ground voltage (0 V)) on the common node N11 to turn off (OFF) the NMOS transistor 120. At this time, the discharge circuit 12 does not provide any discharge path for electrostatic discharge protection.

In the case where the electrostatic discharge protection circuit 1 of the present application does not comprise the voltage clamping circuit 13, if the voltage VCCH charges the capacitor 101 too slowly in the operation mode, or if noise occurs on the bonding pad P10 to induce voltage overshoot on, the gate-source voltage (Vgs) between the gate 110A and the source 110C of the PMOS transistor 110 is greater than the gate-source withstanding voltage of the PMOS transistor 110, which results in damage to the PMOS transistor 110 and further makes the electrostatic discharge protection circuit 1 unable to accomplish its functions.

As shown in FIG. 2A, the electrostatic discharge protection circuit 1 of the present application comprises the voltage clamping circuit 13. if the voltage VCCH charges the capacitor 101 too slowly in the operation mode, or if noise occurs on the bonding pad P10 to induce voltage overshoot on, the gate-source voltage (Vgs) of the PMOS transistor 110 can be clamped at the gate-source withstanding voltage (5 V) or below the gate-source withstanding voltage (5 V) based on the constant voltage characteristic of the Zener diode 130, thereby preventing the PMOS transistor 110 from being damaged.

Figure 2B:
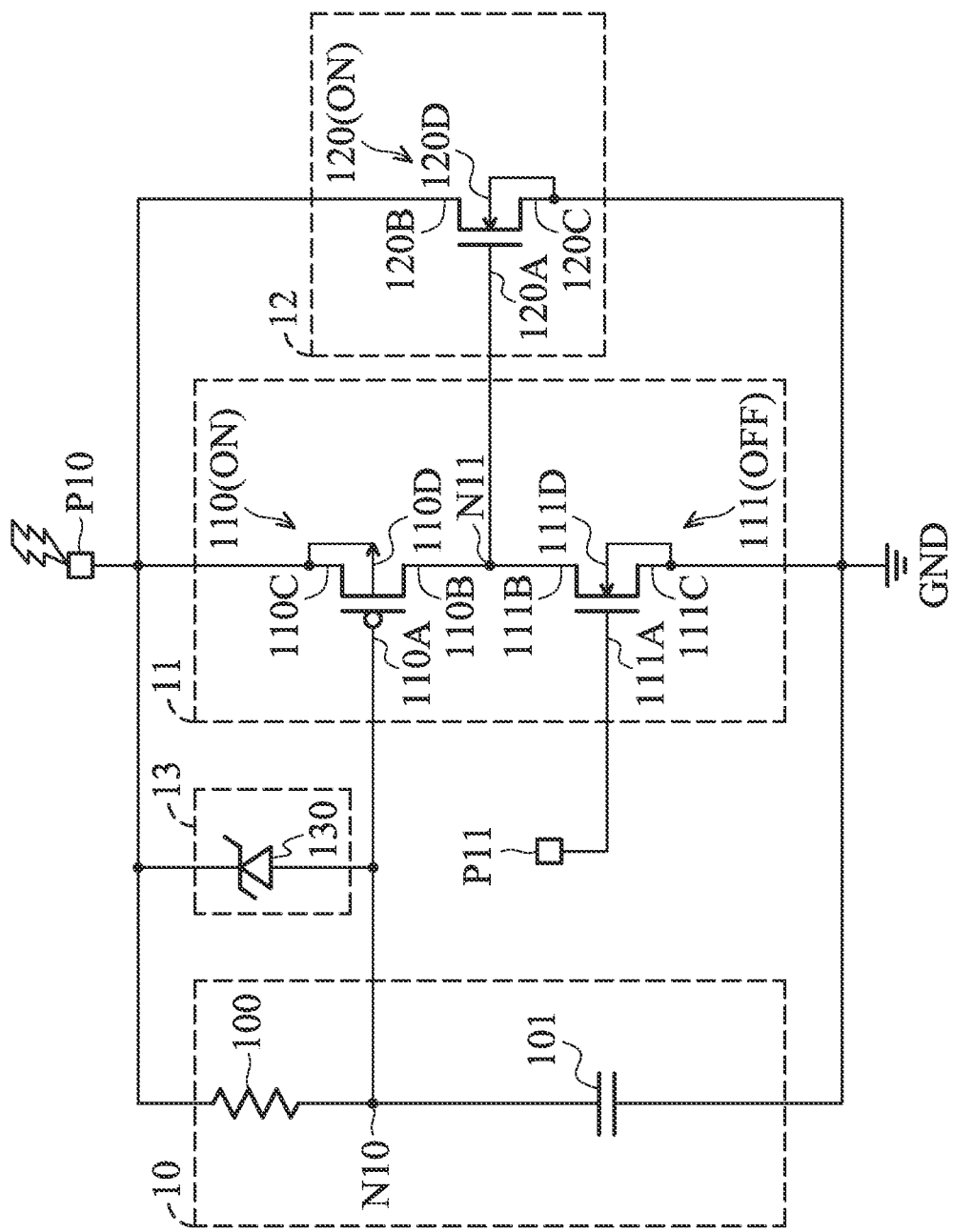
FIG. 2B is a schematic diagram showing an exemplary embodiment of an operation of the ESD protection circuit in FIG. 1 when the ESD protection circuit encounters an ESD event.

Referring to FIG. 2B, when the ESD protection circuit 1 is not in the normal operation mode, the voltage VCCH is not provided to the bonding pad P10, and the voltage VCC is not provided to the bonding pad P11. Therefore, the bonding pads P10 and P11 are in a floating state. When an electrostatic discharge event (for example, a positive electrostatic discharge event) occurs on bonding pad P10, the voltage on bonding pad P10 increases instantaneously. At this time, based on the device characteristics of the capacitor 101, the detection signal on the common node N10 has a low voltage level, that is, there is a low voltage on the common node N10. The low voltage on the common node N10 turns on (ON) the PMOS transistor 110, and the NMOS transistor 111 is turned off (OFF) based on the floating state on the bonding pad P11. Therefore, as the voltage on the bonding pad P10 increases instantaneously, the driving signal on the common node N11 has a high voltage level, that is, there is a high voltage on the common node N11 to turn on (ON) the NMOS transistor 120. Due to the turned-on state of the NMOS transistor 120, a discharge path is formed between the bonding pad P10 and the ground GND so that the electrostatic charges on the bonding pad P10 are conducted to the ground GND along the discharge path, thereby protecting the components or devices coupled to the bonding pad P10 from being damaged by the large current induced by the electrostatic discharge event.

According to the above-mentioned embodiment, the electrostatic discharge protection circuit 1 is provided with the voltage clamping circuit 13 that can clamp the gate-source voltage (Vgs) of the PMOS transistor 110 at the gate-source withstanding voltage or below the gate-source withstanding voltage, which prevents the PMOS transistor 110 from be damaged by the high voltage induced by the ESD event on the bonding pad P10. In addition, even though the protection for the PMOS transistor 110 is achieved by providing the voltage clamping circuit 13 in the embodiment, the protection triggering voltage of the electrostatic discharge protection circuit 1 will not be increased accordingly. In the embodiment of the present invention, the protection triggering voltage of the ESD protection circuit 1 is as low as about 2.5 V, which can cause a discharge path to be provided quickly when an ESD event occurs. Furthermore, the ESD tolerance of the electrostatic discharge protection circuit 1 in the human body model (HBM) of the electrostatic discharge test is increased to 7-7.5 kV, and the ESD tolerance of the mechanical model (MM) is increased to 250 V.

Figure 3:
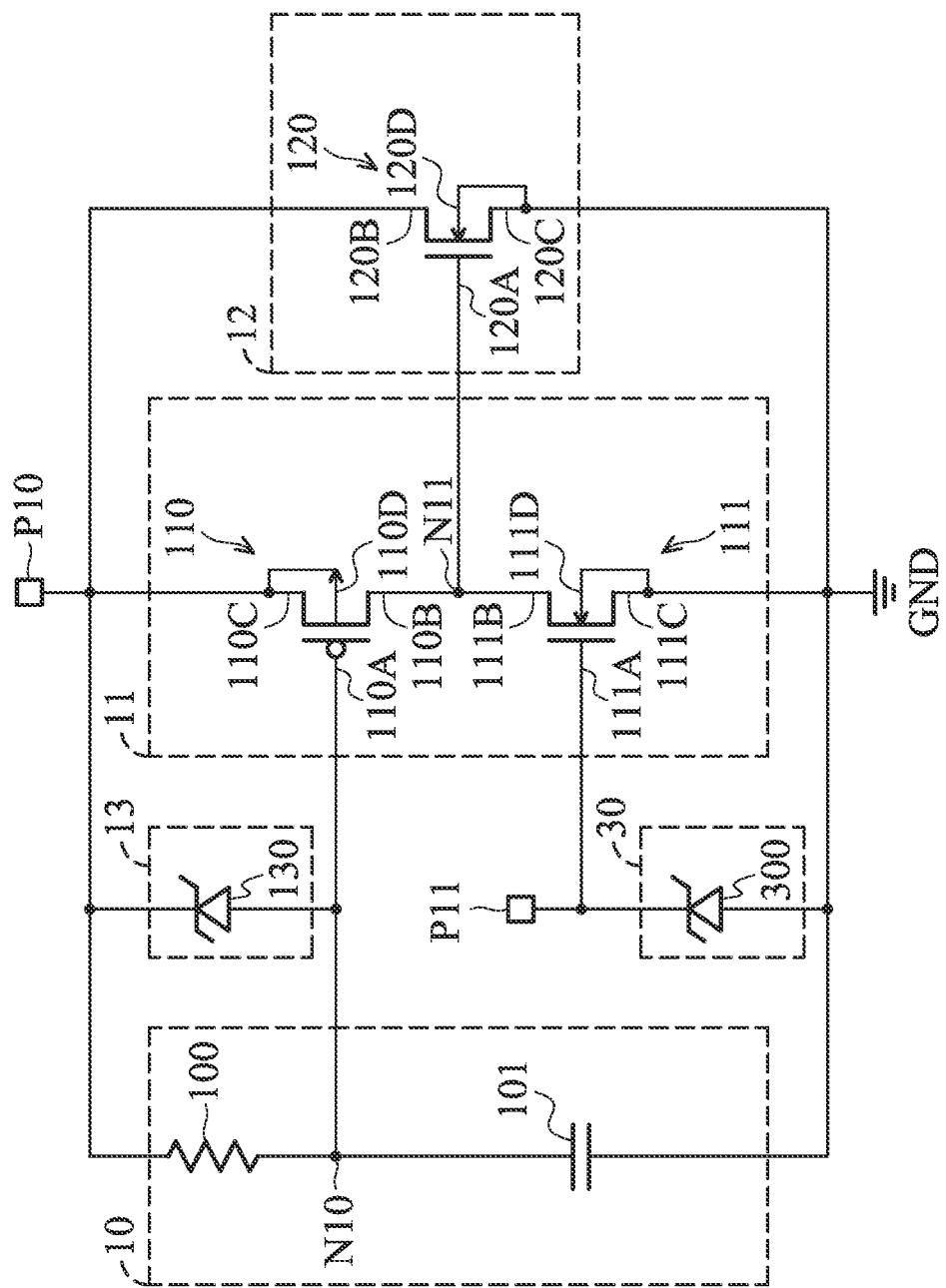
FIG. 3 shows another exemplary embodiment of an electrostatic discharge protection circuit.

In the embodiment shown in FIG. 1, the voltage clamping circuit 13 is provided to protect the PMOS transistor 110. In other embodiments, as shown in FIG. 3, a voltage clamping circuit may be additionally provided to protect the NMOS transistor 111. The electrostatic discharge protection circuit in the embodiment of FIG. 3 is similar to the electrostatic discharge protection circuit in the embodiment of FIG. 1. The electrostatic discharge protection circuit in FIG. 3 is different from the electrostatic discharge protection circuit in FIG. 1 in that the electrostatic discharge protection circuit in FIG. 3 further comprises a voltage clamping circuit 30. In the following paragraphs, only the voltage clamping circuit 30 will be described. For the description of other components, please refer to the related descriptions about FIGS. 1 and 2A-2B. The related descriptions of the other components are omitted here.

Referring to FIG. 3, the voltage clamping circuit 30 is coupled between the gate 111A and the source 111C of the NMOS transistor 111, that is, between the bonding pad P11 and the ground GND. When the electrostatic discharge protection circuit 1 is in the operation mode, the voltage clamping circuit 30 operates to clamp the gate-source voltage (Vgs) between the gate 111A and the source 111C of the NMOS transistor 111 within a voltage range. In the embodiment, the voltage clamping circuit 30 comprises a Zener diode 300. The cathode of the Zener diode 30 is coupled to the gate 111A of the NMOS transistor 111 (that is, the bonding pad P11), and the anode thereof is coupled to the source 111C of the NMOS transistor 111 (that is, the ground GND). In the operation mode, based on the constant voltage characteristic of the Zener diode 300, the gate-source voltage (Vgs) of the NMOS transistor 111 can be clamped at the gate-source withstanding voltage that is determined based on the parameters of the NMOS transistor 111 or below the aforementioned gate-source withstanding voltage, thereby preventing the NMOS transistor 111 from be damaged by due to excessive gate-source voltage (Vgs) of the NMOS transistor 111 that is induced by a high voltage on the bonding pad P11.

Figure 4:
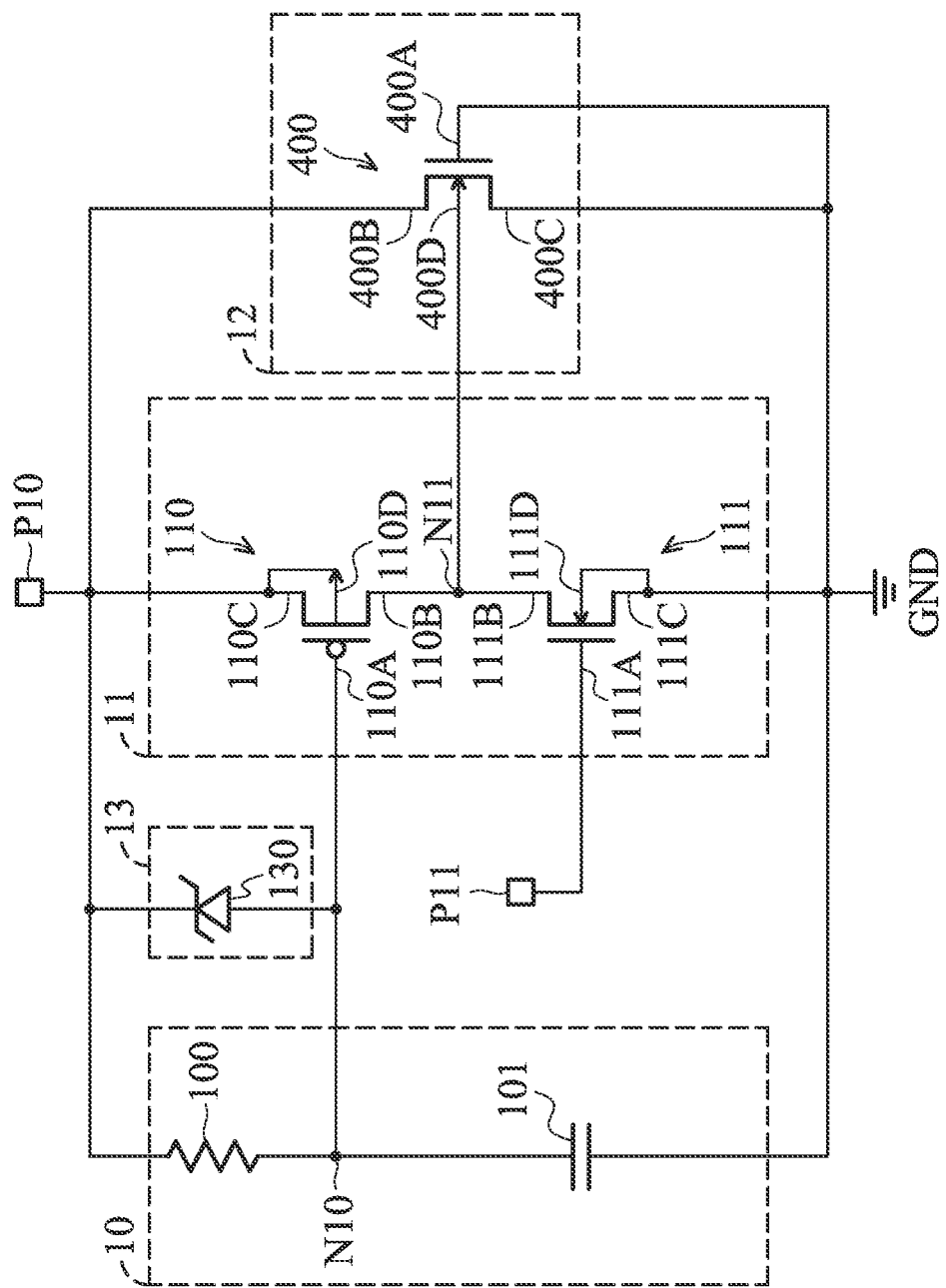
FIG. 4 shows another exemplary embodiment of an electrostatic discharge protection circuit.

In the embodiment of FIG. 1, when an electrostatic discharge event occurs on the bonding pad P10, the NMOS transistor 120 of the discharge circuit 12 is turned on by the gate-triggered manner to provide a discharge path. In other embodiments, as shown in FIG. 4, an NMOS transistor 400 of the discharge circuit 12 is turned on by a substrate-triggered manner to provide a discharge path. The electrostatic discharge protection circuit in the embodiment of FIG. 4 is similar to the electrostatic discharge protection circuit in the embodiment of FIG. 1. The electrostatic discharge protection circuit in FIG. 4 is different from the electrostatic discharge protection circuit in FIG. 1 in that the NMOS transistor 400 of the discharge circuit 12 in FIG. 4 is turned on by the substrate-triggered manner to provide a discharge path. In the following paragraphs, only the NMOS transistor 400 will be described. For the description of the other components, please refer to the related descriptions about FIGS. 1 and 2A-2B. The related descriptions of the other components are omitted here.

Referring to FIG. 4, the NMOS transistor 400 comprises a gate 400A, a drain 400B, a source 400C, and a bulk 400D. The drain 400B of the NMOS transistor 400 is coupled to the bonding pad P10, the source 400C and the gate 400A thereof are coupled to the ground GND, and the bulk 400D thereof is coupled to the common node N11. According to the circuit structure of the discharge circuit 12 in FIG. 4, when an electrostatic discharge event occurs on the bonding pad P10, the NMOS transistor 400 is turned on by the substrate-triggered manner to provide a discharge path. In details, when the electrostatic discharge protection circuit 1 is not in the normal operation mode and an electrostatic discharge event occurs on the bonding pad P10, the voltage on the bonding pad P10 increases instantaneously. At this time, based on the device characteristics of the capacitor 101, the detection signal on the common node N10 has a low voltage level, that is, there is a low voltage on the common node N10. The low voltage on the common node N10 turns on the PMOS transistor 110, and the NMOS transistor 111 is turned off based on the floating state on the bonding pad P11. Therefore, as the voltage on the bonding pad P10 increases instantaneously, the driving signal on the common node N11 has a high voltage level, that is, there is a high voltage on the common node N11. At this time, the bulk 400D and the drain 400B of the NMOS transistor 400 are at high potentials, and the gate 400A and the source 400C thereof are coupled to the ground GND so that the NMOS transistor 400 is turned on, which achieves the substrate triggering. The turned-on NMOS transistor 400 provides a discharge path. The electrostatic charges on the bonding pad P10 are conducted to the ground GND through the NMOS transistor 400 and along the discharge path.

Figure 5:
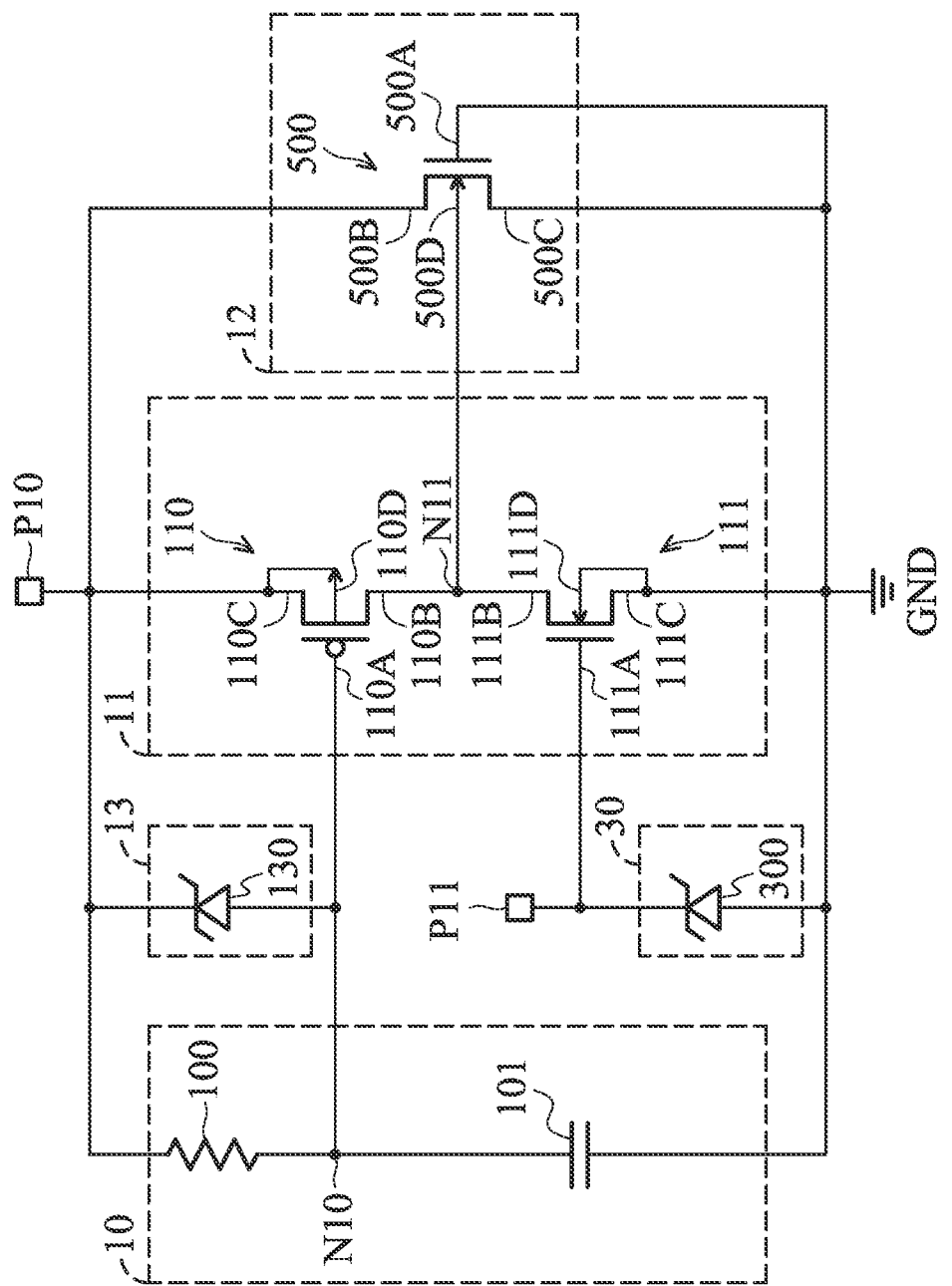
FIG. 5 shows another exemplary embodiment of an electrostatic discharge protection circuit.

In the embodiment shown in FIG. 3, when an electrostatic discharge event occurs on the bonding pad P10, the NMOS transistor 120 of the discharge circuit 12 is turned on by the gate-triggered manner to provide a discharge path. In other embodiments, as shown in FIG. 5, an NMOS transistor 500 of the discharge circuit 12 is turned on by a substrate-triggered manner to provide a discharge path. The electrostatic discharge protection circuit in the embodiment of FIG. 5 is similar to the electrostatic discharge protection circuit in the embodiment of FIG. 3. The electrostatic discharge protection circuit in FIG. 5 is different from the electrostatic discharge protection circuit in FIG. 3 in that the NMOS transistor 500 of the discharge circuit 12 in FIG. 5 is turned on by the substrate-triggered manner to provide a discharge path. In the following paragraphs, only the NMOS transistor 500 will be described. For the description of the other components, please refer to the related descriptions in FIGS. 1-3. The related descriptions of the other components are omitted here.

Referring to FIG. 5, the NMOS transistor 500 comprises a gate 500A, a drain 500B, a source 500C, and a bulk 500D. The drain 500B of the NMOS transistor 500 is coupled to the bonding pad P10, the source 500C and the gate 500A are coupled to the ground GND, and the bulk 500D is coupled to the common node N11. According to the circuit structure of the discharge circuit 12 in FIG. 5, when an electrostatic discharge event occurs on the bonding pad P10, the NMOS transistor 500 is turned on by the substrate-triggered manner to provide a discharge path. In details, when the electrostatic discharge protection circuit 1 is not in the normal operation mode and an electrostatic discharge event occurs on the bonding pad P10, the voltage on the bonding pad P10 increases instantaneously. At this time, based on the device characteristics of the capacitor 101, the detection signal on the common node N10 has a low voltage level, that is, there is a low voltage on the common node N10. The low voltage on the common node N10 turns on the PMOS transistor 110, and the NMOS transistor 111 is turned off based on the floating state on the bonding pad P11. Therefore, as the voltage on the bonding pad P10 increases instantaneously, the driving signal on the common node N11 has a high voltage level, that is, there is a high voltage on the common node N11. At this time, the bulk 500D and the drain 500B of the NMOS transistor 500 are at high potentials, and the gate 500A and the source 500C thereof are coupled to the ground GND so the NMOS transistor 500 is turned on, which achieves the substrate triggering. The turned-on NMOS transistor 500 provides a discharge path. The electrostatic charges on the bonding pad P10 are conducted to the ground GND through the NMOS transistor 500 and along the discharge path.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electrostatic discharge protection circuit coupled to a first bonding pad, comprising:
    an electrostatic discharge detection circuit detecting whether an electrostatic discharge event occurs on the first bonding pad to generate a detection signal on a first node;
    a P-type transistor comprising a source coupled to the first bonding pad, a drain coupled to a second node, and a gate coupled to the first node to receive the detection signal;
    a first N-type transistor comprising a drain coupled to the second node, a source coupled to a ground, and a gate coupled to a second bonding pad; and
    a discharge circuit coupled between the first bonding pad and the ground and controlled by a driving signal on the second node;
    wherein in response to that the electrostatic discharge protection circuit is in an operation mode, the first bonding pad receives a first voltage, and the second bonding pad receives a second voltage.

2. The electrostatic discharge protection circuit as claimed in claim 1, wherein in response to that the electrostatic discharge protection circuit is in the operation mode, the first voltage is greater than the second voltage.

3. The electrostatic discharge protection circuit as claimed in claim 1, wherein the electrostatic discharge detection circuit comprises:
    a resistor coupled between the first bonding pad and the first node; and
    a capacitor coupled between the first node and the ground.

4. The electrostatic discharge protection circuit as claimed in claim 1 further comprising:
    a first voltage clamping circuit coupled between the gate and the source of the P-type transistor,
    wherein in response to that the electrostatic discharge protection circuit is in the operation mode, the first voltage clamping circuit operates to clamp a first gate-source voltage between the gate and the source of the P-type transistor at a within a first voltage range.

5. The electrostatic discharge protection circuit as claimed in claim 4, wherein the first voltage clamping circuit comprises:
    a Zener diode comprising a cathode coupled to the source of the P-type transistor and an anode coupled to the gate of the P-type transistor.

6. The electrostatic discharge protection circuit as claimed in claim 4 further comprising:
    a second voltage clamping circuit coupled between the gate and the source of the first N-type transistor,
    wherein in response to that the electrostatic discharge protection circuit is in the operation mode, the second voltage clamping circuit operates to clamp a second gate-source voltage between the gate and the source of the first N-type transistor within a second voltage range.

7. The electrostatic discharge protection circuit as claimed in claim 6, wherein the second voltage clamping circuit comprises:
    a Zener diode comprising a cathode coupled to the gate of the first N-type transistor and an anode coupled to the source of the first N-type transistor.

8. The electrostatic discharge protection circuit as claimed in claim 6, wherein the discharge circuit comprises:
    a second N-type transistor comprising a drain coupled to the first bonding pad, a source coupled to the ground, and a gate coupled to the second node.

9. The electrostatic discharge protection circuit as claimed in claim 6, wherein the discharge circuit comprises:
    a second N-type transistor comprising a drain coupled to the first bonding pad, a source coupled to the ground, a gate coupled to the ground, and a bulk coupled to the second node.

10. The electrostatic discharge protection circuit as claimed in claim 1, wherein in response to that the electrostatic discharge event occurs on the first bonding pad, the discharge circuit provides a discharge path between the first bonding pad and the ground according to the driving signal.

11. The electrostatic discharge protection circuit as claimed in claim 1, wherein the discharge circuit comprises:
    a second N-type transistor comprising a drain coupled to the first bonding pad, a source coupled to the ground, and a gate coupled to the second node.

12. The electrostatic discharge protection circuit as claimed in claim 1, wherein the discharge circuit comprises:
    a second N-type transistor comprising a drain coupled to the first pad, a source and a gate coupled to the ground, and a bulk coupled to the second node.

* * * * *